United States Patent
Jakobsson

(10) Patent No.: US 6,529,884 B1
(45) Date of Patent: Mar. 4, 2003

(54) MINIMALISTIC ELECTRONIC COMMERCE SYSTEM

(75) Inventor: Bjorn Markus Jakobsson, Hoboken, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/352,963

(22) Filed: Jul. 14, 1999

(51) Int. Cl.[7] .............................................. G06F 17/60
(52) U.S. Cl. ............................. 705/64; 705/65; 705/67; 705/69; 380/30
(58) Field of Search .............................. 705/39, 69, 65, 705/13, 71, 77, 79; 380/30; 235/379

(56) References Cited

U.S. PATENT DOCUMENTS

| | | | | |
|---|---|---|---|---|
| 4,399,323 A | * | 8/1983 | Henry | 380/30 |
| 4,405,829 A | * | 9/1983 | Rivest et al. | 380/30 |
| 4,868,877 A | * | 9/1989 | Fischer | 380/30 |
| 4,947,430 A | * | 8/1990 | Chaum | 380/30 |
| 5,191,193 A | * | 3/1993 | Le Roux | 235/379 |
| 5,220,604 A | * | 6/1993 | Gasser et al. | 340/5.74 |
| 5,511,121 A | * | 4/1996 | Yacobi | 705/69 |
| 5,832,089 A | * | 11/1998 | Kravitz et al. | 705/39 |
| 5,850,450 A | * | 12/1998 | Schweitzer et al. | 380/30 |
| 6,105,013 A | * | 8/2000 | Curry et al. | 705/65 |
| 6,212,634 B1 | * | 4/2001 | Geer et al. | 380/280 |
| 6,240,187 B1 | * | 5/2001 | Lewis | 705/71 |

FOREIGN PATENT DOCUMENTS

JP   10327146 A  * 12/1998

OTHER PUBLICATIONS

Menezes et al, "Handbook of Applied Cryptography", CRC Press, 1997, Chapters 5 and 11.*
Prior Art—"Addition Chain Heuristics", Jurjen Bos et al, pp. 400–407, The Netherlands.

* cited by examiner

Primary Examiner—Hyung-Sub Sough
Assistant Examiner—M. Huseman
(74) Attorney, Agent, or Firm—Walter J. Tenecza, Jr.

(57) ABSTRACT

The present invention provides a system for electronic commerce that reduces the amount of data needed to be stored on a user computer or electronic device. A bank processor stores information corresponding to coins or funds and the user device (such as a payer or merchant processor) needs to only store a single secret key needed to access the data stored in the bank's memory. The user's device can be a smart card since only a minimal amount of data needs to be stored on the user's device. The bank processor of the present invention may hold disposable anonymous accounts in a bank memory. When a coin is spent, the corresponding account is deleted from the bank's memory and a new account is created which corresponds to a new coin. This completes a payment from a payer processor to a merchant processor. The new account is the merchant's account. This implementation avoids the threat of computer virus attacks since a smart card is far less susceptible to these. This implementation also allows pre-paid smart cards to be used by not requiring a link to the identity of the smart card owner. The present invention offers users computational (but not revocable) privacy, and protects against the bank robbery attack. The method provides chain privacy in that the bank processor will not be able to correlate the identity of users to payments that are in between the initial deposit into a traditional account and the final withdrawal from a traditional account.

11 Claims, 3 Drawing Sheets

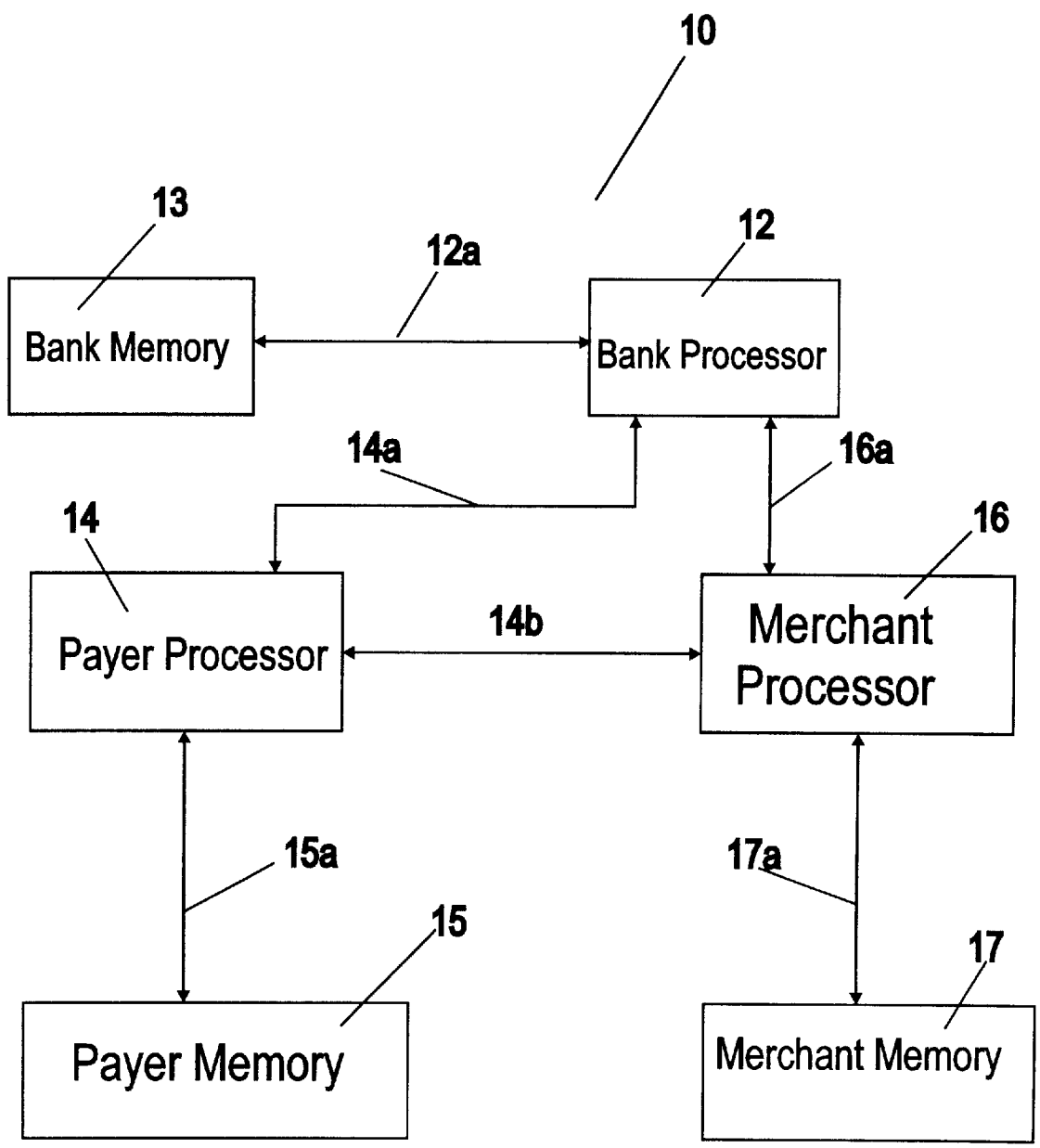

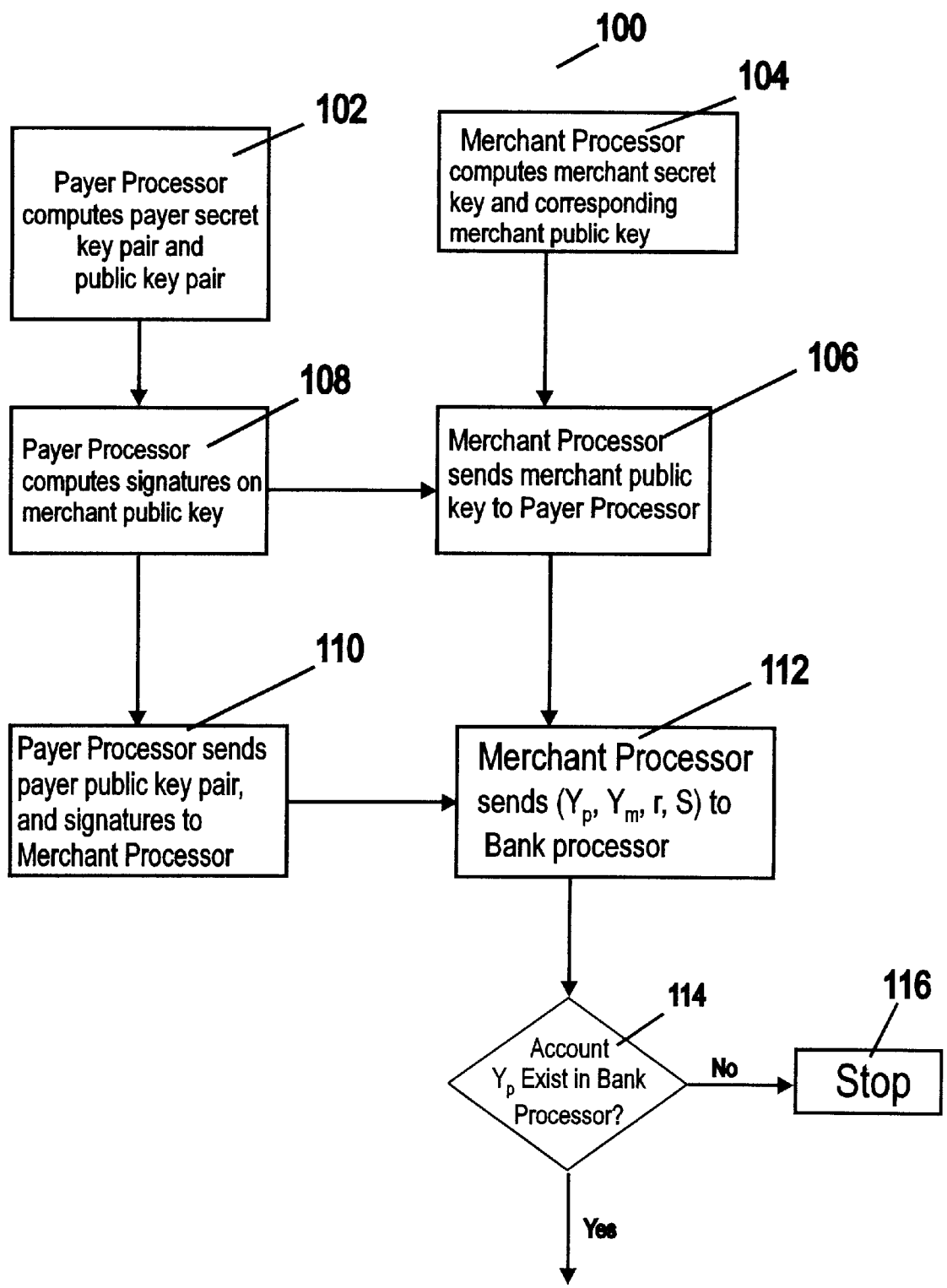

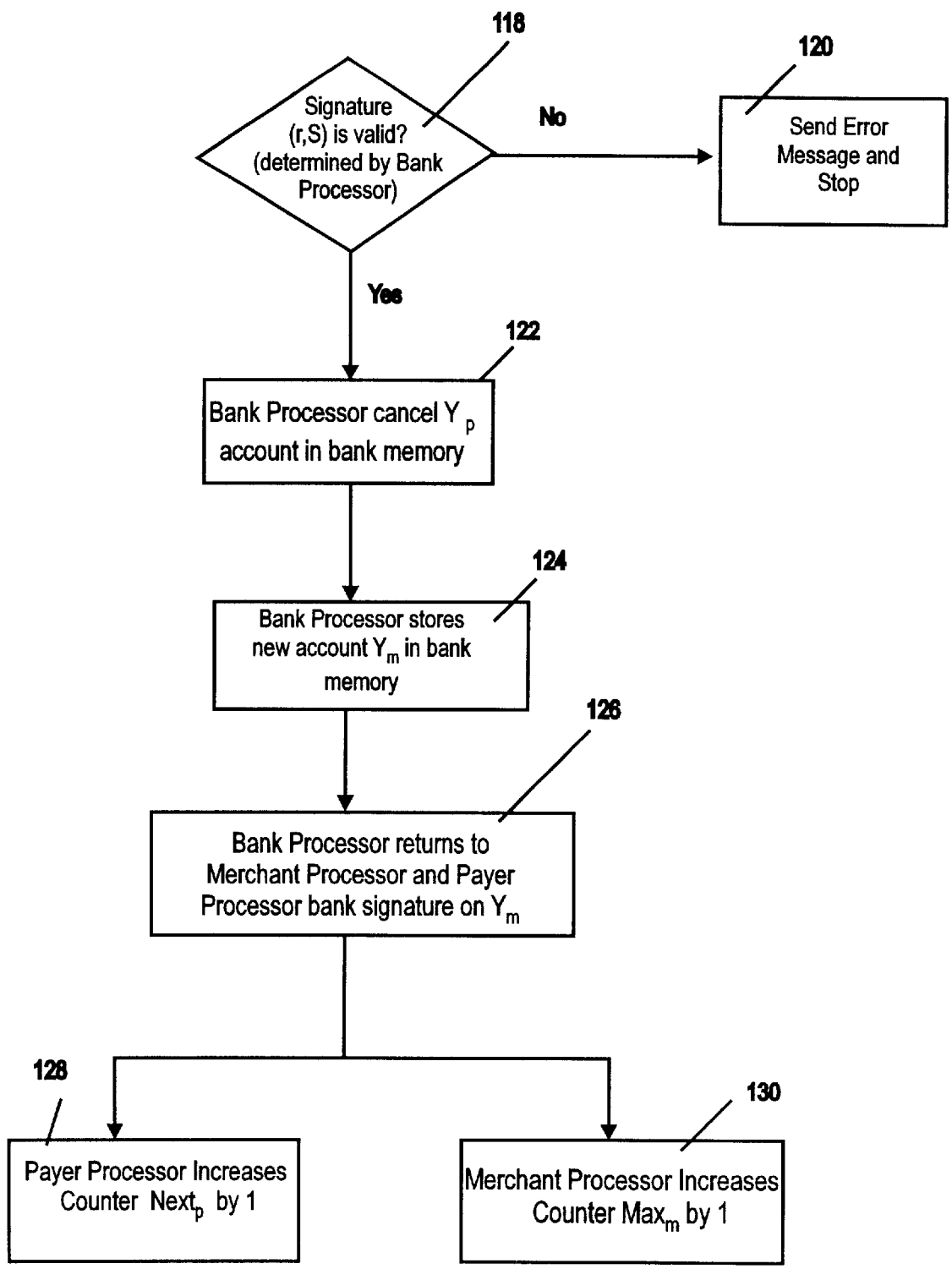

MINIMALISTIC ELECTRONIC COMMERCE SYSTEM

FIELD OF THE INVENTION

This invention relates to improved methods and apparatus for electronic commerce.

BACKGROUND OF THE INVENTION

In many electronic commerce systems a representation of coins is kept by a user such as payers and merchants. The users may keep on a computer or other electronic device a plurality of secrets and signatures, one for each unspent coin. The merchant and a bank may keep a plurality of signatures, one for each spent coin. However, this type of electronic commerce system is difficult to implement using inexpensive devices since it requires the user's (payer or merchant) device to have a substantial amount of memory to store the secrets and signatures.

SUMMARY OF THE INVENTION

It is an object of the present invention to provide a system for electronic commerce that reduces the amount of data needed to be stored on a user computer or electronic device. In one embodiment of the present invention a bank processor stores information corresponding to coins or funds and the user device (such as a payer or merchant processor) needs to only store a single secret seed and one or more counters needed to access the data stored in the bank's memory. The user's device can be a smart card since only a minimal amount of data needs to be stored on the user's device. A "smart card" in this application is defined as special purpose computer or electronics hardware that only runs one computer program, in contrast to personal computers (PCs) which run any program that is loaded on to the computer. This implementation avoids the threat of computer virus attacks since a smart card is far less susceptible to such attacks. This implementation also allows pre-paid smart cards to be used by not requiring a link to the identity of the smart card owner.

The bank processor of the present invention may hold disposable anonymous accounts in a bank memory. When a coin is spent, the corresponding account is deleted from the bank's memory and a new account is created. This completes a payment from a payer processor to a merchant processor. The new account is the merchant's account.

In one embodiment an apparatus or system is provided comprising a bank processor, a payer processor, and a merchant processor. Each can be connected to each other by communications links. Each processor may be connected to an associated electronics memory device. The payer memory may have stored therein a payer secret seed and a payer counter. The merchant memory may have stored therein a merchant secret seed and a merchant counter. The payer processor may compute a first payer secret key and a corresponding first payer public key by using the payer secret seed and the payer counter. The merchant processor may compute a first merchant secret key and a corresponding first merchant public key by using the merchant secret seed and the merchant counter. The merchant processor may send the first merchant public key to the payer processor and the payer processor may compute a signature on the first merchant public key. The signature, first merchant public key, and first payer public key may be sent to the bank processor which would check the bank memory to determine if the first payer public key is stored there and determine if the signature is a valid signature. The bank processor may cancel the account corresponding to the first payer public key from the bank memory and store a new account in the bank memory corresponding to the first merchant public key, if the signature is valid and if an account corresponding to the first payer public key was previously stored in the bank memory.

A method in accordance with an embodiment of the present invention offers users computational (but not revocable) privacy, and protects against the so-called "bank robbery" attack. The method provides so-called "chain privacy" in that the bank processor will not be able to correlate the identity of users to payments that are in between the initial deposit into an account and the final withdrawal from an account.

BRIEF DESCRIPTION OF THE DRAWINGS

FIG. 1 shows an apparatus or system for performing electronic commerce transactions in accordance with an embodiment of the present invention; and FIGS. 2A–2B show a flow chart in accordance with a method for use with the embodiment of FIG. 1.

DETAILED DESCRIPTION OF THE DRAWINGS

FIG. 1 shows an apparatus 10 for performing electronic commerce transactions in accordance with an embodiment of the present invention. The apparatus 10 includes bank processor 12, payer processor 14, and merchant processor 16. The bank processor 12 is connected to the payer processor 14 by communications link 14a. The bank processor 12 is connected to the merchant processor 16 by communications link 16a. Each of the processors 12, 14, and 16 is connected by a communications link to a memory. Bank processor 12 is connected to bank memory 13 by communications link 12a. Payer processor 14 is connected to payer memory 15 by communications link 15a. Merchant processor 16 is connected to merchant memory 17, by communications link 17a. The bank processor 12 may, in some embodiments of the present invention communicate only with one of either the payer processor 14 and the merchant processor 16 and let for example the payer processor 14 forward messages to the merchant processor 16 (or vice versa).

The processors 12, 14, and 16 may be any type of processor such as found in personal computers, on integrated circuits, or on smart electronic cards or any other device. The communications link 14a may be comprised of a modem on the bank processor 12 end of the communications link 14a, a telephone line and a modem on the payer processor 14 end of communications link 14a. Communications link 16a may be comprised of similar components. The telephone line could be hardwired or a wireless channel.

FIGS. 2A–2B show a flow chart 100 in accordance with a method of a payment transaction for use with the embodiment of FIG. 1. Prior to this method an operator of a payer processor 14 can check to make sure he has sufficient funds to make payment. The balance of a payer processor 14 can be checked over the communications link 14a by using a personal identification number ("PIN").

At step 102 the payer processor 14 uses the below equations to compute:

$$\text{a payer secret key pair } (x_p, k) = (f(\sigma_p, \text{next}_p, 1), f(\sigma_p, \text{next}_p, 2)) \quad (1)$$

where $\sigma_p$ is the secret seed of the payer processor 14 and $\text{next}_p$ is the next counter for the secret key pair. The quantity k is a random number which is generated by the payer processor 14 The quantity $_{op}$ is the secret seed and it is always available to the payer processor 14 by being stored in the payer memory 15 and is initially chosen at random. The function f may be a hash function or some other function which can be described as a so-called random oracle, which is a type of function well known to those skilled in the art.

$$\text{a payer public key pair } (y_P, r) = (g^{x_P}, g^k) \quad (2)$$

where r is function generated by the payer processor 14 and where $x_P$ and k have been defined and g is a publicly known generator and the computation is performed using a prime modulo p.

The payer secret key pair and the payer public key pair may be stored temporarily in the payer memory 15. However when a new payer secret key and public key pair is computed, the previous payer secret key pair and public key pair may be deleted. This results in a substantial memory savings for the payer memory 15 since it does not have to save all payer secret key pairs generated and/or payer public key pairs generated. The payer memory 15 only needs to store long term the payer secret seed $_{op}$ and the counter for generation of the payer secret key pair, next$_p$ and another counter called "max$_P$". The quantity next$_p$ is the next coin to be spent and the quantity max$_p$ is the kept coin or coinage that may be spent, i.e. a counter saying "how high to count" before the payer is out of money. Both of these are counters.

At step 104 in FIG. 2A, the merchant processor 104 uses the below equations to compute:

$$\text{a merchant secret key } x_M = f(_{oM}, \max_M+1, 1); \quad (3)$$

and a $$\text{a merchant public key } y_M = g^{x_M} \bmod p \quad (4)$$

where $_{oM}$ is the merchant secret seed and max$_M$ is the merchant secret seed counter.

Where, again g is a publicly known generator and the function f may be a hash function.

The merchant secret key and the merchant public key may be stored in the merchant memory 17 temporarily. However when a new merchant secret key and a new merchant public key are calculated, the old keys may be deleted from memory 17. This results in a substantial memory savings for the merchant memory 17. The merchant memory 17 only needs to store long term the merchant secret seed $_{oM}$ and the counter for generation of the merchant counter max$_M$. The quantity max$_M$ is not a secret key but rather a counter saying "how high to count" before the merchant is out of money.

At step 106 the merchant processor 16 sends its merchant public key $y_M$ (but not its secret key $x_M$) to payer processor 14 via communications link 14b. At step 108 the payer processor 14 computes the signature s on the merchant public key $y_M$ using the following equation (or another method for computation of a digital signature):

$$s = k - x_P H(y_M, r) \bmod q \quad (5)$$

where H is an appropriate Hash function and the other quantities have been defined. The quantity (p−1) is a multiple of q. The signatures s and r may be Schnorr signatures. A variety of other schemes may be used in place of Schnorr signatures.

At step 110 the payer processor 14 sends the payer public key pair ($y_P$,r), and the signature s to the merchant processor 16. The merchant processor 16, at step 112 sends the quantities ($y_P$, $y_M$, r,s) to the bank processor 12 via communications link 16a. The bank processor 12 checks to see if the account $y_P$ (the public key for the payer processor 14) exists in the bank memory 13. If this account does not exist then the attempted payment transaction is not allowed by the bank processor 12 and the method is stopped at step 116. If the account $y_P$ does exist then the bank processor 12 next determines if the signature (r,s) is valid at step 118 which may be by checking if $g^s y_P^{H(y_M,r)} = r$ If the signature (r,s) is not valid then the bank processor 12 doesn't allow the payment transaction and the bank processor 12 may send an error message to the payer processor 14 and/or the merchant processor 16 and thereafter the method stops at step 120. If the signature (r,s) is valid then the bank processor 12 cancels the $y_P$ account in the bank memory 13 at step 122. The bank processor 12 also stores a new account $y_M$ in the bank memory 13 at step 124. At step 126 the bank processor 12 returns a bank signature on $y_M$, called an acknowledgement, which may be an electronic signal, to the merchant processor 16 and to the payer processor 14 to acknowledge that the payment transaction has successfully taken place.

At step 128 the payer processor 14, after receiving the acknowledgement signal increases the counter next$_p$ by one. The merchant processor 16, at step 130, increases its counter max$_M$ by one after receiving the acknowledgement signal from the bank processor 12. The merchant processor 16 can become a payer (i.e., function like the payer processor 14) in another transaction. Similarly, the payer processor 14 can become a merchant (i.e., function like the merchant processor 16) in another transaction. In this manner, accrued accounts are spent as above.

The payer processor 14 and its memory 15 or the merchant processor 16 and its memory 17 may be implemented as smart cards. The smart cards do not have to provide information regarding the owner of the smart cards. In this way, the smart cards may be sold as "pre-paid" cards because it is not possible to use money that does not correspond to accounts (as opposed to credit cards, where it is possible to spend a large amount, up to the limit) also as opposed to many other e-cash schemes. This aspect makes bank robbery attacks impossible for this embodiment of the present invention.

The present invention in some embodiments makes knowledge of a bank processor's secret keys useless because if a thief gets the bank secret key, the thief can not produce invalid money ("minting at home") since to do so, the thief would need to write to the Bank's database. If a thief stole someone's smart card used in accordance with the present invention the thief would be able to obtain funds for the number of disposable accounts the smart card has. However if an owner of a smart card has a backup of the seed of the smart card at home (or "escrowed" by the bank) then he can block these funds from being spent by the thief, simply by spending them himself to create accounts for himself. However, if the bank secret key is stolen in embodiments of the present invention, the thief cannot mint money.

The present invention in some embodiments makes bank robbery attacks impossible. In some embodiments the present invention makes it possible to block funds on lost or stolen card. Only fixed and small memory storage are required, independently of cash balance of smart card. It is easy to make backups of funds using embodiments of the present invention. It is easy to transfer funds. Short transcripts can be used and there is a low computational cost. The present invention provides for fast transactions by preprocessing (computing r from k, computing x and k from seed and counters). Only low power computation is needed making use of contact-less smart cards possible. These smart cards have no battery but get their power by induction (similar to how source radios do—from the radio waves).

I claim:

1. An apparatus comprising:

a bank processor;

a bank memory connected to the bank processor;

a payer processor connected by a first communications link to the bank processor;

a payer memory connected to the payer processor;

a merchant processor connected by a second communications link to the payer processor and by a third communications link to the bank processor;

a merchant memory connected to the merchant processor;

wherein the payer memory has stored therein a payer secret seed and a payer counter;

wherein the merchant memory has stored therein a merchant secret seed and a merchant counter;

wherein the payer processor computes a first payer secret key and a corresponding first payer public key by using the payer secret seed and the payer counter;

wherein the merchant processor computes a first merchant secret key and a corresponding first merchant public key by using the merchant secret seed and the merchant counter;

wherein the merchant processor sends the first merchant public key to the payer processor and the payer processor computes a signature on the first merchant public key;

wherein the payer processor sends the signature and the first payer public key to the merchant processor;

wherein the signature, first merchant public key, and the first payer public key are sent to the bank processor by the merchant processor;

wherein the bank processor checks the bank memory to determine if the first payer public key is stored there and the bank processor determines if the signature is a valid signature;

and wherein the bank processor cancels an account corresponding to the first payer public key from the bank memory and stores a new account in the bank memory corresponding to the first merchant public key, if the signature is valid and if the account corresponding to the first payer public key was previously stored in the bank memory.

2. The apparatus of claim 1 wherein;

the bank processor returns an acknowledgment signal to the payer processor and the merchant processor if the account corresponding to the first payer public key was cancelled and the new account corresponding to the first merchant public key was stored.

3. The apparatus of claim 2 wherein:

the payer processor increases the payer counter by one following receiving the acknowledgement signal from the bank processor; and the merchant processor increases the merchant counter by one following receiving the acknowledgement signal from the bank processor.

4. A payer device comprising:

a payer processor;

a payer memory;

wherein the payer memory has stored therein a payer secret seed and a payer counter;

wherein the payer processor computes a first payer secret key and a corresponding first payer public key by using the payer secret seed and the payer counter; and wherein the payer processor receives a merchant public key from a merchant processor and the payer processor computes a signature on the merchant public key.

5. The apparatus of claim 4 and wherein:

the payer device sends the signature, the merchant public key, and a payer public key to the merchant processor which sends the signature, the merchant public key, and the payer public key to a bank processor.

6. The apparatus of claim 4 and wherein:

the payer device is special purpose computer hardware that only runs one computer program.

7. A method comprising the steps of:

computing a first payer secret key and a corresponding first payer public key by using a payer secret seed and a payer counter;

computing a first merchant secret key and a corresponding first merchant public key by using a merchant secret seed and a merchant counter;

computing a signature on the first merchant public key;

sending the signature, the first merchant public key, and the first payer public key to a merchant processor which sends the signature, first merchant public key, and the first payer public key to a bank processor;

determining if the first payer public key is stored in a bank memory;

determining if the signature is a valid signature; and canceling an account corresponding to the first payer public key from the bank memory and storing a new account in the bank memory corresponding to the first merchant public key, if the signature is valid and if an account corresponding to the first payer public key was previously stored in the bank memory.

8. The method of claim 7 further comprising the step of:

returning an acknowledgment signal from the bank processor to a payer processor and a merchant processor if the account corresponding to the first payer public key was cancelled and the new account corresponding to the first merchant public key was stored.

9. The method of claim 8 further comprising the step of:

increasing the payer counter by one following receiving the acknowledgement from the bank processor; and increasing the merchant counter by one following receiving the acknowledgement from the bank processor.

10. A method comprising the step of:

storing a payer secret seed and a payer counter in a payer memory;

computing, at a payer processor, a first payer secret key and a corresponding first payer public key by using the payer secret seed and the payer counter; and receiving, at the payer processor, a merchant public key from a merchant processor;

and computing, at the payer processor, a signature on the merchant public key.

11. The method of claim 10 comprising the step of:

causing the payer processor to send the signature, merchant public key, and a payer public key to a merchant processor which sends the signature, the merchant public key, and the payer public key to a bank processor.

* * * * *